United States Patent [19]
Voorman et al.

[11] Patent Number: 5,974,099
[45] Date of Patent: Oct. 26, 1999

[54] UNRELIABILITY DETECTOR APPARATUS AND REPRODUCTION APPARATUS PROVIDED WITH THE UNRELIABILITY DETECTOR APPARATUS

[75] Inventors: Johannes O. Voorman; Johannes W. M. Bergmans, both of Eindhoven, Netherlands

[73] Assignee: U.S. Philips Corporation, New York, N.Y.

[21] Appl. No.: 09/135,859

[22] Filed: Aug. 18, 1998

[30] Foreign Application Priority Data

Sep. 9, 1997 [EP] European Pat. Off. .............. 97202766

[51] Int. Cl.$^6$ ...................................................... H03D 1/00
[52] U.S. Cl. ...................... 375/340; 455/67.6; 455/226.2
[58] Field of Search ................................... 375/224, 228, 375/340; 455/226.1, 226.2, 67.6; 702/189, 193; 714/819; 327/74

[56] References Cited

U.S. PATENT DOCUMENTS

| | | | |
|---|---|---|---|
| 5,134,632 | 7/1992 | Fletcher et al. | 375/238 |
| 5,463,654 | 10/1995 | Bergmans | 375/341 |
| 5,465,059 | 11/1995 | Pan et al. | 327/12 |

*Primary Examiner*—Don N. Vo
*Assistant Examiner*—Lenny Jiang
*Attorney, Agent, or Firm*—Bernard Franzblau

[57] ABSTRACT

An unreliability detector apparatus for generating an unreliable decision signal in response to an input signal. An input terminal receives the input signal, a first comparator unit compares the input signal with a first threshold value and a second comparator unit compares the input signal with a second threshold value. A processor is provided for carrying out a function for determining whether a curve in an X-Y plane has at least one point in common with a predetermined line in the X-Y plane. The curve in the X-Y plane is obtained by plotting time equivalent signals values of the first and second comparator output signals along the Y- and X-axis respectively of the X-Y plane, while the predetermined line in the X-Y plane is formed by a first line interconnecting a first fixed point and a second fixed point and in which half plane a third fixed point is located. The three fixed points are obtained by plotting combinations of a first through a fourth signal value along the X- and Y-axis. The processor is adapted to generate the unreliable decision signal upon detecting that the curve has at least one point in common with the predetermined line. An apparatus for reading information from a record carrier may be provided with the unreliability detection apparatus.

6 Claims, 5 Drawing Sheets

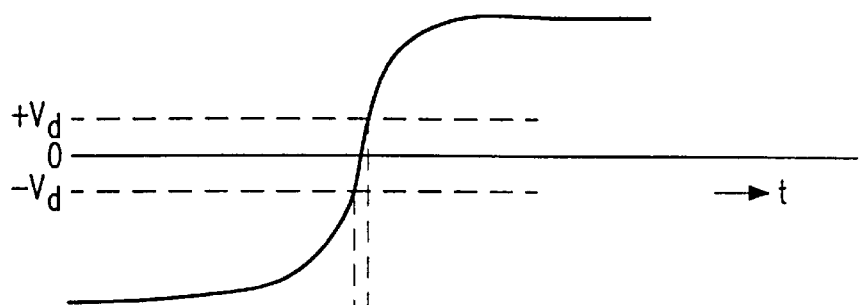
FIG. 2a
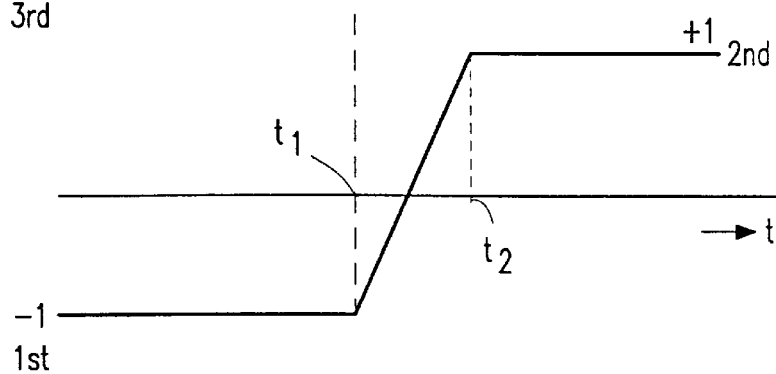
FIG. 2b
FIG. 2c
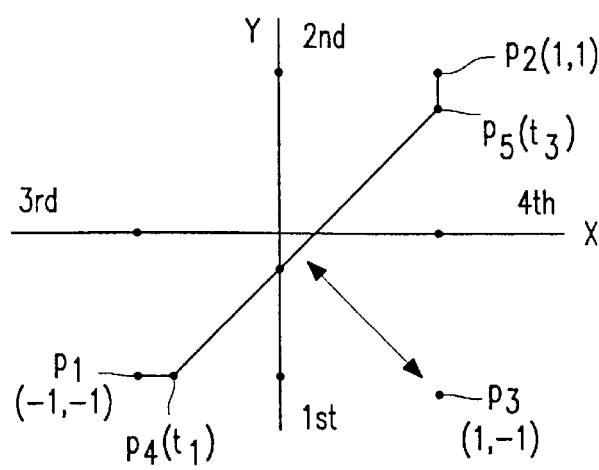
FIG. 3

UNRELIABILITY DETECTOR APPARATUS AND REPRODUCTION APPARATUS PROVIDED WITH THE UNRELIABILITY DETECTOR APPARATUS

BACKGROUND OF THE INVENTION

The invention relates to an unreliability detector apparatus and to a reproduction apparatus provided with the unreliability detector apparatus. Unreliability detector apparatuses are generally provided with two comparators in which the input signal is compared with a positive and a negative threshold level respectively that lie between the maximum positive signal level and the zero signal level and between the maximum negative signal level and zero respectively.

In a bit detector, it is commonly decided whether the signal is positive or negative. A positive signal is said to correspond with a +1 and a negative signal with a −1. Ideally, signal values at the decision moments are +100% or −100%: that is, without noise and other disturbances. Decisions, which are taken from the signal around the +100% or −100% values are almost certainly correct. Decisions, which are taken from the signal near the zero level are uncertain.

With two threshold levels, equal to $+V_d$ and $-V_d$ respectively, a decision $>+V_d$ is said to correspond with +1 and a decision $<-V_d$ is said to correspond with −1.

Decisions between $-V_d$ and $+V_d$ are less certain. They are called erasures. The number of erasures depends strongly on the levels of the decision thresholds. For increasing threshold values, the erasure rate will increase very strongly.

If we consider erasures as uncertain bit decisions, we can try to make these uncertain bit decisions more certain. This is what is done in a dual decision feedback equalizer (DDFE). DDFEs are well known in the art. Reference is made in this respect to international patent application no. IB97/00792, which corresponds to copending U.S. application Ser. No. 08/886,997 filed Jul. 2, 1997.

SUMMARY OF THE INVENTION

The invention aims at providing an unreliability detector apparatus for detecting erasures. Such erasures occur as unreliable samples taken from the input signal, from which samples the bits are normally to be detected.

The unreliability apparatus in accordance with the invention comprises an unreliability detector apparatus for generating an unreliable decision signal in response to an input signal, the apparatus comprising
input means for receiving the input signal,
first comparator means that carries out a function equivalent to comparing the input signal with a first threshold value $(+V_d)$ of positive polarity and for supplying a first comparator output signal in response thereto, the said first comparator output signal changing over from a first signal value (−1) towards a second signal value (+1) upon the input signal exceeding the first threshold value, and vice versa,
second comparator means that carries out a function equivalent to comparing the input signal with a second threshold value $(-V_d)$ of negative polarity and for supplying a second comparator output signal in response thereto, the said second comparator output signal changing over from a third signal value (−1) towards a fourth signal value (+1) upon the input signal exceeding the second threshold value, and vice versa,
distance value calculation means that carries out a function equivalent to calculating a distance value from the first and second comparator output signals, the said distance value having a relationship with the distance in an X-Y plane between a fixed point and a curve in said plane, said curve in said plane being obtained by plotting time equivalent signal values of the first and the second comparator output signals along the Y- and X-axis respectively of said X-Y plane, forming points in said X-Y plane that form the said curve, said fixed point $(P_3)$ in said X-Y plane being obtained by plotting said first signal value along said Y-axis and said fourth signal value along said X-axis,
third comparator means that carries out a function equivalent to comparing said distance value with a distance threshold value and for generating the unreliable decision signal upon said distance value not exceeding said distance threshold value.

Another embodiment, the apparatus in accordance with the invention comprises an unreliability detector apparatus for generating an unreliable decision signal in response to an input signal, the apparatus comprising
input means for receiving the input signal,
first comparator means that carries out a function equivalent to comparing the input signal with a first threshold value $(+V_d)$ of positive polarity and for supplying a first comparator output signal in response thereto, the said first comparator output signal changing over from a first signal value (−1) towards a second signal value (+1) upon the input signal exceeding the first threshold value, and vice versa,
second comparator means that carries out a function equivalent to comparing the input signal with a second threshold value $(-V_d)$ of negative polarity and for supplying a second comparator output signal in response thereto, the said second comparator output signal changing over from a third signal value (−1) towards a fourth signal value (+1) upon the input signal exceeding the second threshold value, and vice versa,
processing means for carrying out a function equivalent to determining whether a curve in an X-Y plane, said curve in said plane being obtained by plotting time equivalent signal values of the first and the second comparator output signals along the Y- and X-axis respectively of said X-Y plane, has at least one point in common with a predetermined line in said X-Y plane, said predetermined line lying in a half plane in said X-Y plane formed by a first line interconnecting a first fixed point and a second fixed point and in which half plane a third fixed point is located, said first fixed point $(P_1)$ being obtained by plotting said first signal value along said Y-axis and said third signal value along said X-axis, said second fixed point $(P_2)$ being obtained by plotting said second signal value along said Y-axis and said fourth signal value along said X-axis, said third fixed point $(P_3)$ in said X-Y plane being obtained by plotting said first signal value along said Y-axis and said fourth signal value along said X-axis, said predetermined line lying in said half plane between said first line and said third point, the processing means further being adapted to generate the unreliable decision signal upon detecting that said curve has at least one point in common with said predetermined line.

The invention is based on the following recognition. Assuming an ideal behaviour of the first and second comparator means, which may be in the form of latches, the two comparator means arrive at the same decision. That is to say: assuming short response times of the comparator means compared to the bit frequency period, the decisions travel back and forth between the first and second points in the X-Y plane defined above.

However, in a situation when the response times of the comparator means is of the same order as the bit period, the decision curve deviate from the straight line between the above defined first and second points in the X-Y plane. The third point $P_3$, defined above corresponds with an erasure. Generally, the decision curves formed during each polarity transition of the input signal will run through the first and second points and lie inside the triangle formed by the first, second and third points. The smaller the distance from the curve to the point $P_3$, the larger the chance of occurrence of an erasure.

In accordance with the invention, during each polarity transition of the input signal, the distance from the point $P_3$ to the decision curve is determined and the said distance is compared with a distance threshold value. A sample taken from the input signal is considered unreliable for the detection of a bit, when it is taken from the input signal at a time instant when it is determined that the said distance is smaller than said distance threshold value. In the second embodiment, it is determined whether the decision curve has at least one point in common with the predetermined line in said X-Y plane. The sample taken from the input signal is considered unreliable for the detection of a bit, when it is taken from the input signal at a time instant when said curve has at least one point in common with said predetermined line.

BRIEF DESCRIPTION OF THE DRAWING

These and other aspects of the invention will be apparent from and elucidated with respect to embodiments described hereafter in the figure description, in which FIG. 3 shows a fictitious X-Y plane with the output signals of the comparator units as given in the FIGS. 2b and 2c plotted along the X and Y axis in this plane, FIG. 4 in FIG. 4a shows another example of the input signal of the detection apparatus as a function of time, in FIG. 4b the output signal of the second comparator unit of the detection apparatus in response to that other input signal and in FIG. 4c the output signal of the first comparator unit in response to that other input signal.

DESCRIPTION OF THE PREFERRED EMBODIMENTS

Figure 1A:
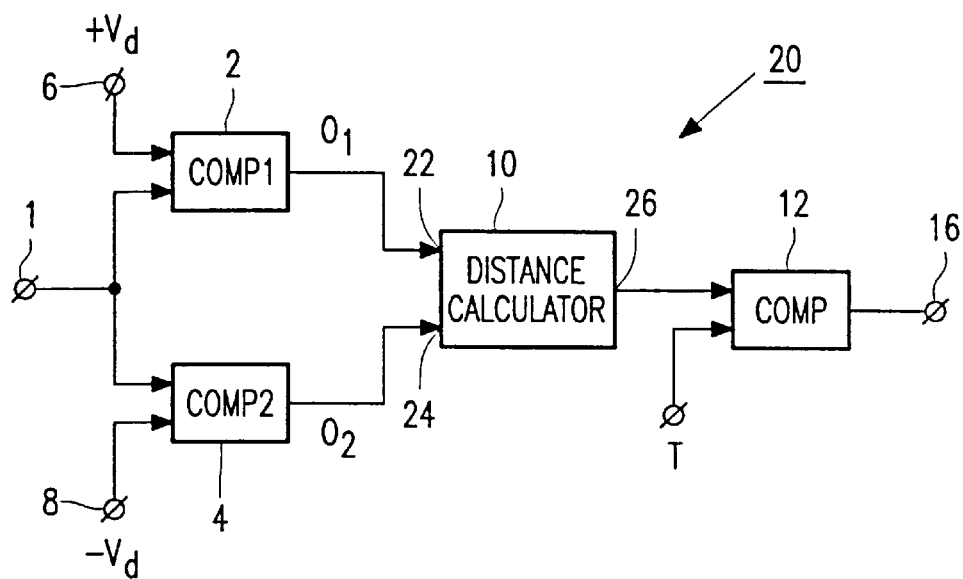
FIG. 1a shows a first embodiment and FIG. 1b shows a second embodiment of the unreliability detection apparatus, FIG. 2 in FIG. 2a shows an example of the input signal of the detection apparatus as a function of time, in FIG. 2b the output signal of the second comparator unit of the detection apparatus in response to that input signal and in FIG. 2c the output signal of the first comparator unit in response to that input signal.

FIG. 1 shows an embodiment of the unreliability detection apparatus. The apparatus comprises an input terminal 1 for receiving an input signal, which input terminal is coupled to a first input of a first comparator unit 2 and a second comparator unit 4. A second input of the first comparator unit 2 is coupled to a terminal 6 at which terminal a first threshold value $+V_d$ is available. A second input of the second comparator unit 4 is coupled to a terminal 8 at which terminal a second threshold value $-V_d$ is available. Outputs of the first and second comparator units 2 and 4 respectively are coupled to corresponding inputs of a distance calculation unit 10, which has an output coupled to a first input of a comparator unit 12. A second input of the comparator unit 12 is coupled to a terminal 14 at which terminal a threshold value T is available. An output of the comparator unit 12 is coupled to an output terminal 16 on which an unreliable decision signal is available.

Figure 1B:
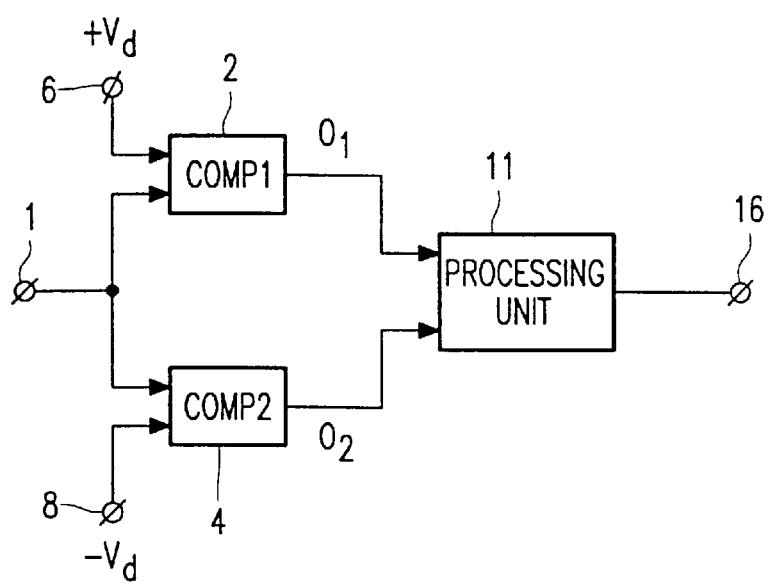

FIG. 1b shows another embodiment of the apparatus, which shows much resemblance with the apparatus of FIG. 1a. The apparatus of FIG. 1b differs from the apparatus of FIG. 1a in that, instead of the distance calculator unit 10 and the comparator unit 12, a processing unit 11 is provided, which has an output coupled to the output terminal 16 for providing the unreliable decision signal.

The functioning of both embodiments will be further described hereafter.

The first comparator unit 2 compares the input signal with the first threshold value $+V_d$ and supplies a first comparator output signal in response thereto at its output. The second comparator unit 4 compares the input signal with the second threshold value $-V_d$ and supplies a second comparator output signal in response thereto at its output. The functioning of the first and second comparator units 2 and 4 will be further described with reference to FIG. 2 and 3, and with reference to FIG. 4 and 5.

FIG. 2a shows a portion of the input signal as a function of time, during a polarity reversal of the input signal. FIG. 2a further discloses the first and second threshold values $+V_d$ and $-V_d$ respectively. FIG. 2b shows schematically the output signal of the comparator unit 4 as a function of time and FIG. 2c shows schematically the output signal of the comparator unit 2 as a function of time. Upon crossing the $-V_d$ level at the time instant to, the output signal of the comparator unit 4 changes from a negative level (the third signal level claimed) such as the level −1, to a positive level (the fourth signal level claimed), such as +1. Upon crossing the $+V_d$ level at the time instant $t_1$, the output signal of the comparator unit 2 changes from a negative level (the first signal level claimed) such as the level −1, to a positive level (the second signal level claimed), such as +1.

FIG. 3 shows a fictitious X-Y plane in which the output signal of the first comparator unit 2 is plotted along the vertical Y-axis and the output signal of the second comparator unit 4 is plotted along the horizontal X-axis. Time equivalent signal values of the output signals of the comparator units 2 and 4 are combined so as to form points in the X-Y plane, said points forming a curve between the points $P_1$ and $P_2$. The point $P_1$ characterizes the situation prior to the time instant to, as well as at the time instant to, where both output signals of the comparator units 2 and 4 have the output value −1. The point $P_2$ characterizes the situation after the time instant $t_2$, as well as at the time instant $t_2$, where both the output signals of the comparator units 2 and 4 have the output value +1. Other points on the curve between the points $P_1$ and $P_2$ are the point $P_4(t_1)$, characterizing the situation at the time instant $t_1$, when the input signal crosses the threshold value $+V_d$, and the point $P_5(t_3)$, characterizing the situation when the output signal of the comparator unit 4 reaches the level +1. During the transition, the curve is thus followed in the direction from the point $P_1$ to the point $P_2$.

Suppose that the portion of the input signal shown in FIG. 2a, which portion includes a polarity reversal from a negative polarity to a positive polarity, was mirror imaged around the time axis. Such mirror imaging would lead to a polarity reversal in the input signal from a positive polarity to a negative polarity. It will be evident that such polarity reversal would lead to the same curve in the X-Y plane, as shown in FIG. 3, which curve is now passed in a direction from the point $P_2$ to the point $P_1$.

Figure 4A:
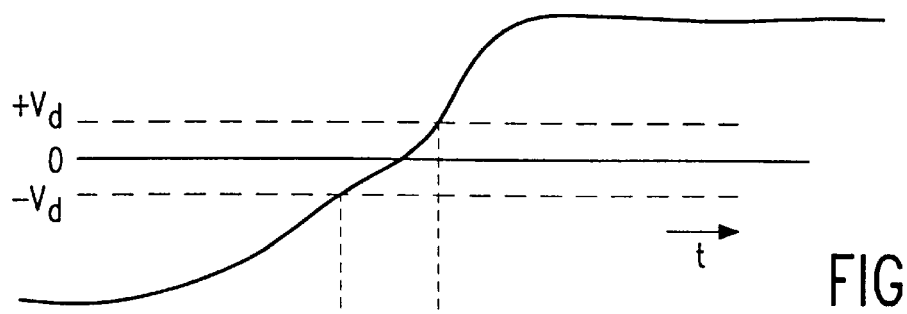
Figure 4B:
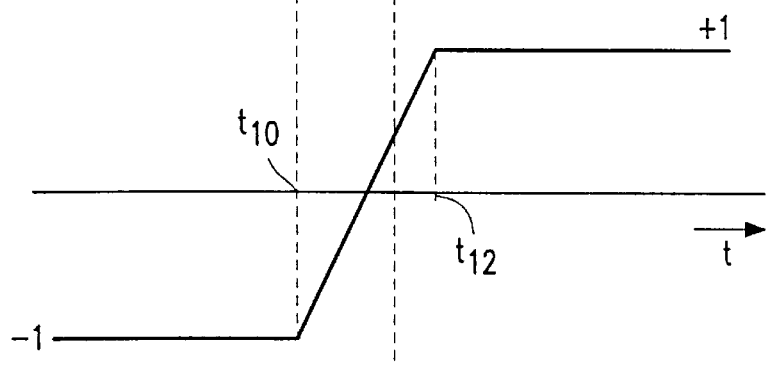
Figure 4C:
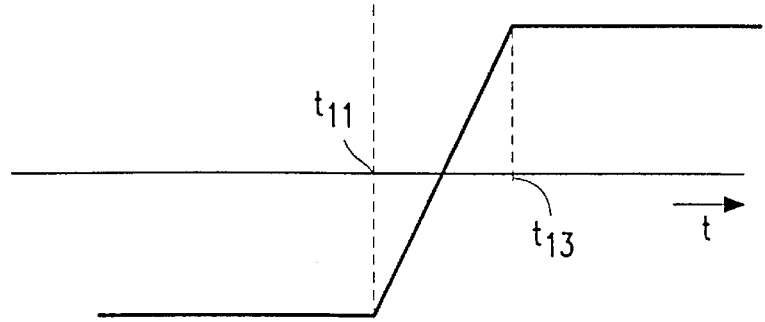

FIG. 4a shows again a portion of the input signal as a function of time, during a polarity reversal. Compared to FIG. 2a, the polarity reversal in FIG. 4a is slower. FIG. 4b shows again schematically the output signal of the comparator unit 4 as a function of time and FIG. 4c shows again schematically the output signal of the comparator unit 2 as a function of time.

FIG. 5 shows again the fictitious X-Y plane in which the output signal of the first comparator unit 2 is plotted along the vertical Y-axis and the output signal of the second comparator unit 4 is plotted along the horizontal X-axis. The point $P_1$ characterizes the situation prior to the time instant $t_{10}$, as well as at the time instant $t_{10}$, where both output signals of the comparator units 2 and 4 have the output value $-1$. The point $P_2$ characterizes the situation after the time instant $t_{13}$, as well as at the time instant $t_{13}$, where both the output signals of the comparator units 2 and 4 have the output value $+1$. Other points on the curve between the points $P_1$ and $P_2$ are the point $P_4(t_{11})$, characterizing the situation at the time instant $t_{11}$, when the input signal crosses the threshold value $+V_d$, and the point $P_5(t_{12})$, characterizing the situation when the output signal of the comparator unit 4 reaches the level $+1$.

Figure 5:
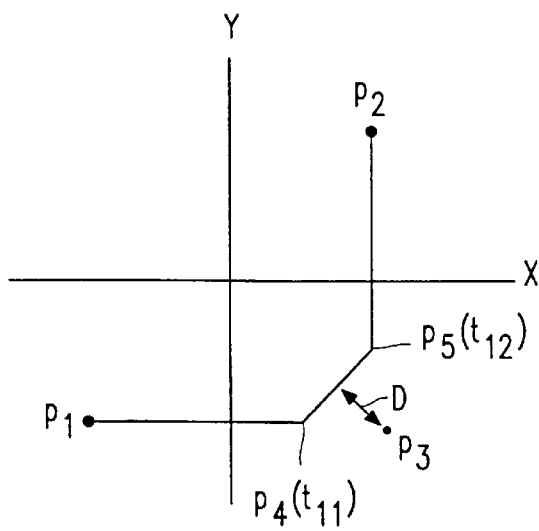
FIG. 5 shows the fictitious X-Y plane with the output signals of the comparator units as given in the FIGS. 4b and 4c plotted along the X and Y axis in this plane, FIG. 6 an elaboration of the processing unit 11 in the apparatus of FIG. 1b.

The curves in the FIGS. 3 and 5 have a certain distance D from the point $P_3$. Comparing FIG. 3 with FIG. 5 makes clear that the distance D of the curve from the point $P_3$ is larger in FIG. 3 than in FIG. 5. The smaller the distance D of the curve from the point $P_3$, the larger is the unreliability of the sample, when it is taken from the input signal during the time interval between the points $P_4$ and $P_5$.

The distance calculator unit 10 in FIG. 1a is adapted to calculate the said distance value D, which distance value is supplied to the first input of the comparator unit 12. The comparator unit 12 compares the distance D calculated with a threshold distance value T. When the distance D calculated is smaller than said threshold value T, the comparator unit 12 generates an unreliable detection signal at the output terminal 16.

Figure 8:
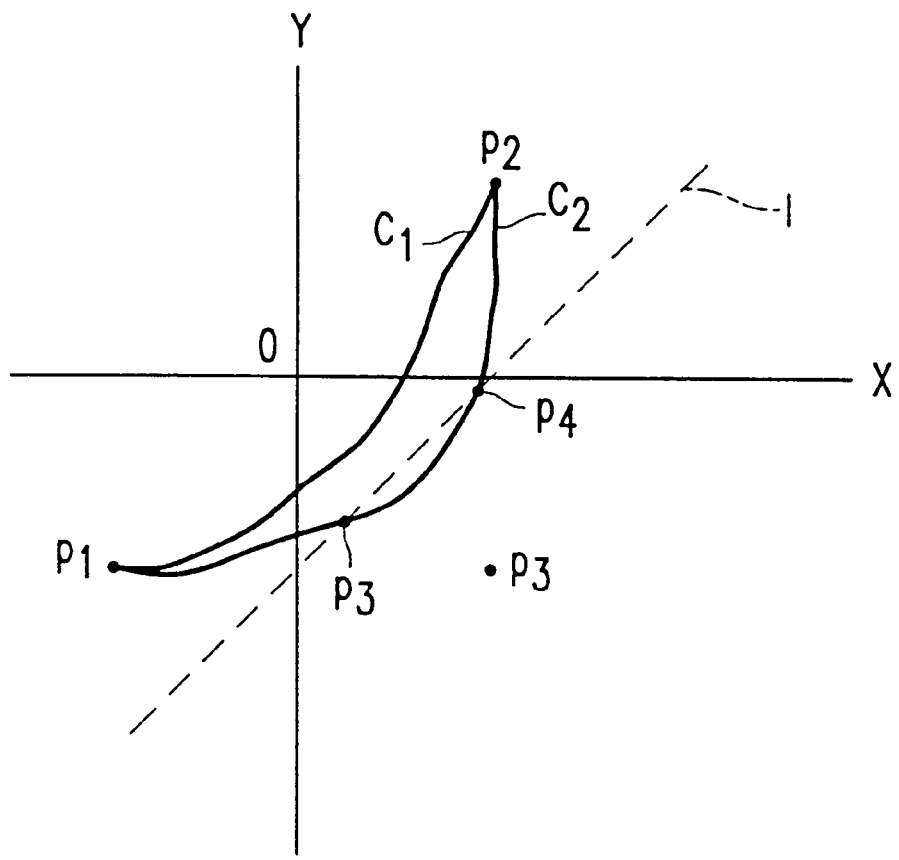

The curves shown in the FIGS. 3 and 5 are ideal curves. More realistic curves are shown in FIG. 8. FIG. 8 shows two curves $C_1$ and $C_2$, between the points $P_1$ and $P_2$, characterizing two polarity transitions in the input signal of different shape. For detecting whether a sample taken from the input signal is unreliable or not, in a way different from what has been explained above in relation to the embodiment of FIG. 1a, the embodiment of FIG. 1b can be used.

The functioning of the processing unit 11 of the embodiment of FIG. 1b will now be explained hereafter. The processing unit 11 is adapted carry out a function equivalent to determining whether a curve, such as the curves $C_1$ and $C_2$ in figure has at least one point in common with a predetermined line in said X-Y plane. This line is given in FIG. 8 by the line 1.

The line 1 is defined as lying in a half plane in said X-Y plane formed by a line interconnecting the points $P_1$ and $P_2$, in which half plane the point $P_3$ is located, see FIG. 8.

More specifically, the line 1 lies in said half plane between said line through the points $P_1$ and $P_2$ and said point $P_3$.

From FIG. 8, it is clear that the curve $C_2$ has at least one point in common with the line 1. The processing unit 11 is now adapted to generate the unreliable decision signal upon establishing that the curve $C_2$ has at least one point in common with the line 1. A sample taken from the input signal during a time interval corresponding to the time interval in which the curve $C_2$ is followed between the points $P_3$ and $P_4$, is now considered unreliable.

Figure 6:
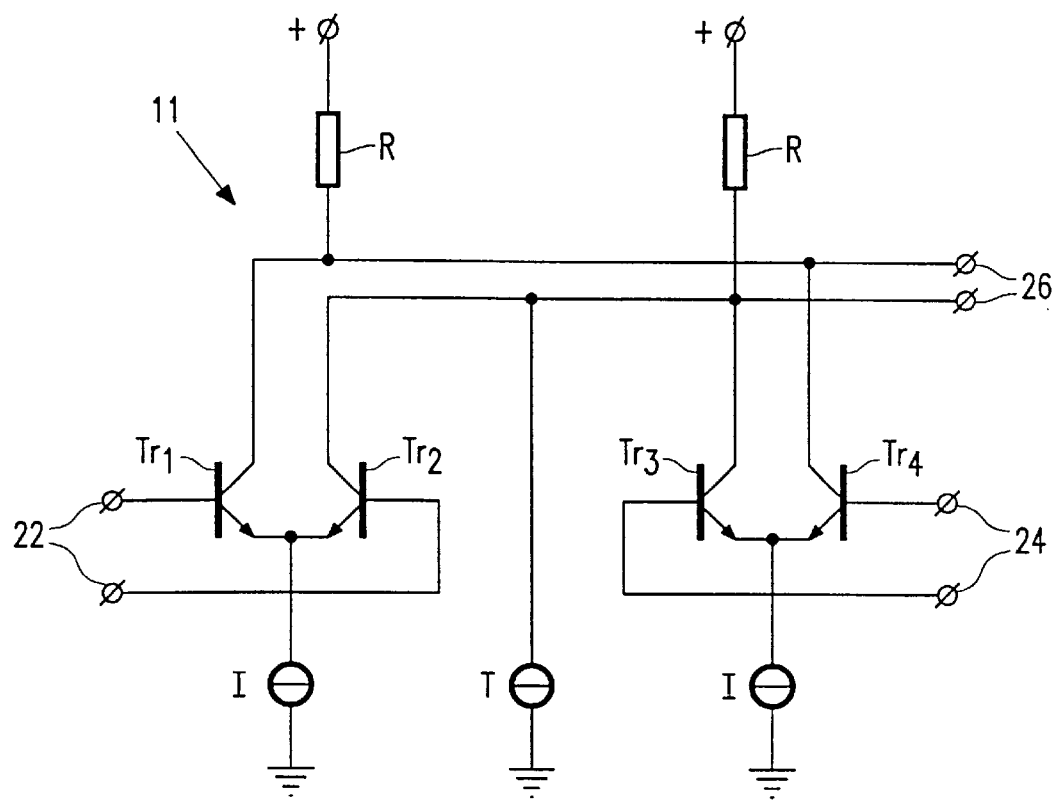

FIG. 6 shows an elaboration of the processing unit 11 of FIG. 1b. The unit 11 comprises a first transistor pair $Tr_1,Tr_2$, having interconnected emitters, and a second transistor pair $Tr_3,Tr_4$, also having interconnected emitters. The transistors are in the form of NPN transistors. The bases of the transistor pair $Tr_1,Tr_2$ are coupled to the terminals denoted 22, being the first input of the processing unit 11. The bases of the transistor pair $Tr_3,Tr_4$ are coupled to the terminals denoted 24, being the second input of the calculator unit 10. The interconnected emitters of both transistor pairs are each coupled via a corresponding current source I to a point of constant potential, such as ground The collectors of the transistors $TR_1$ and $Tr_4$ are interconnected and coupled to a second point of constant potential (+) via an impedance R. The collectors of the transistors $Tr_2$ and $Tr_3$ are also coupled to the second point of constant potential (+) via an impedance R. The interconnected collectors are further coupled to terminals, denoted 26, that form the output of the processing unit 11. Further, a current source, denoted T, is available which is coupled between the first point of constant potential and the interconnected collectors of the transistors $TR_2$ and $Tr_3$. The current source T could be identified as the current that sets the position of the line 1 with respect to the point $P_3$, as shown in FIG. 8. In the present embodiment, the line 1 is perpendicular to the line $O-P_3$. Varying the current amplitude of the current source T results in shifting the line 1 in the direction $O-P_3$.

During the polarity transition characterized by the curve $C_1$, the polarity of the signal at the output terminal 26 does not change. This is an indication that the bit(s) detected during this transition is (are) reliable. During the polarity transition characterized by the curve $C_2$, curve $C_2$ intersects the line 1. This results in the polarity of the signal at the output terminal 26 to change. This is an indication that the bit(s) detected in response to samples taken from the input signal during this transition may not be reliable.

Figure 7:
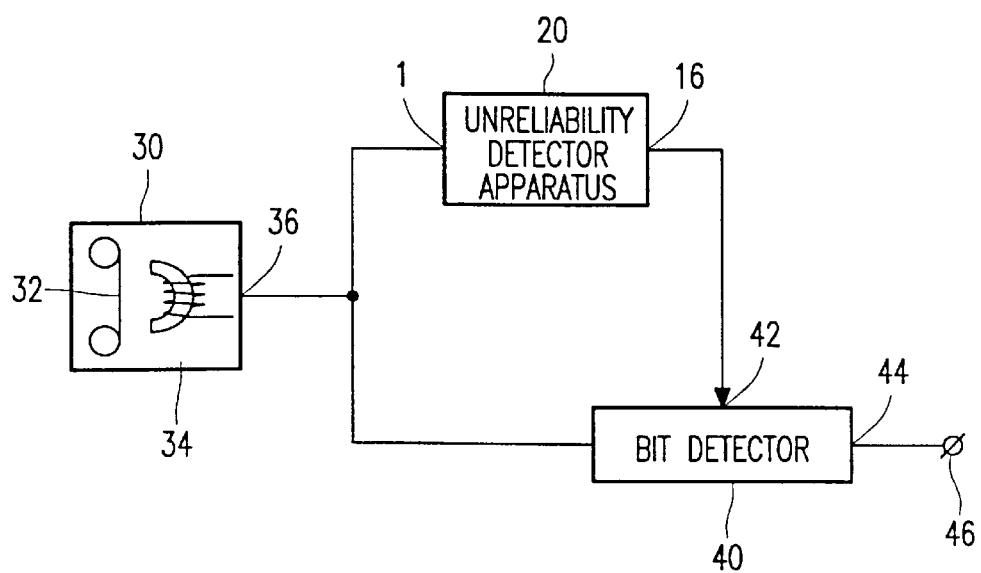
FIG. 7 shows the incorporation of the detection apparatus of FIG. 1 in an apparatus for reading information from a record carrier, and FIG. 8 again shows the X-Y plane with two curves characterizing two polarity transitions in the input signal.

The unreliability detector apparatuses described above can be used in an apparatus for reading data from a record carrier. This apparatus is shown in FIG. 7. The reading apparatus comprises a reading unit 30 for reading a signal from a record carrier 32, such as a magnetic record carrier. The reading unit 30 comprises a read head 34 for reading the information from the record carrier 32. The information thus obtained is supplied via an output 36 to the input terminal 1 of the unreliability detector apparatus 20, as well as to a bit detector unit 40, well known in the art. The output terminal 16 of the unreliability detector apparatus 20 is coupled to a control signal input 42 of the bit detector unit 40. An output 44 of the bit detector unit 40 is coupled to the output terminal 46 of the reading apparatus.

The output signal of the unreliability detector apparatus 20 is supplied to the control signal input 42 of the bit detector unit 40. In response to an unreliability detection signal supplied by the apparatus 20, the bit detector unit 40 will either issue a bit unmodified, when the unreliability detector apparatus generates no detection signal, or will carry out a correction step on the bit, in order to correct the bit in the case an unreliable decision signal has been generated.

Whilst the invention has been described with reference to preferred embodiments thereof, it is to be understood that these are not limitative examples. Thus, various modifications may be come apparent to those skilled in the art, without departing from the scope of the invention, as defined by the claims. As an example, in the claims, it is defined that the first comparator means carries out a function equivalent to comparing the input signal with the first threshold value of positive polarity and for supplying a first comparator output signal in response thereto, and that the second comparator means carries out a function equivalent to comparing the input signal with the second threshold value of negative polarity and for supplying a second comparator output signal in response thereto. The reason for this is that various ways of realizing this behaviour are possible. One of those, is the way described above with reference to FIG. 1. But other ways are also possible, such as adding a voltage $+V_d$ to the input signal and comparing the signal thus obtained with a zero threshold value in the comparator unit 4 and subtracting voltage $+V_d$ from the input signal and comparing the signal thus obtained with a zero threshold value in the comparator unit 2.

Further, the invention lies in each and every novel feature or combination of features.

We claim:

1. Unreliability detector apparatus for generating an unreliable decision signal in response to an input signal, the apparatus comprising:

input means for receiving the input signal, first comparator means for comparing the input signal with a first threshold value ($+V_d$) of positive polarity and for supplying a first comparator output signal in response thereto, said first comparator output signal changing over from a first signal value (−1) towards a second signal value (+1) upon the input signal exceeding the first threshold value, and vice versa, second comparator means for comparing the input signal with a second threshold value ($-V_d$) of negative polarity and for supplying a second comparator output signal in response thereto, said second comparator output signal changing over from a third signal value (−1) towards a fourth signal value (+1) upon the input signal exceeding the second threshold value, and vice versa, distance value calculation means that carries out a function for calculating a distance value from the first and second comparator output signals, said distance value having a relationship with the distance in an X-Y plane between a fixed point and a curve in said plane, said curve in said plane being obtained by plotting time equivalent signal values of the first and the second comparator output signals along the Y- and X-axis respectively of said X-Y plane, forming points in said X-Y plane that form said curve, said fixed point in said X-Y plane being obtained by plotting said first signal value along said Y-axis and said fourth signal value along said X-axis, and third comparator means that carries out a function for comparing said distance value with a distance threshold value and for generating the unreliable decision signal upon said distance value not exceeding said distance threshold value.

2. Apparatus for reading data from a record carrier, the apparatus comprising read means for reading a signal from said record carrier, detector means for detecting bits in said signal, output means for supplying said bits as the data, wherein the apparatus is provided with the unreliability detector apparatus as claimed in claim 1.

3. Unreliability detector apparatus for generating an unreliable decision signal in response to an input signal, the apparatus comprising:

input means for receiving the input signal, first comparator means for comparing the input signal with a first threshold value ($+V_d$) of positive polarity and for supplying a first comparator output signal in response thereto, said first comparator output signal changing over from a first signal value (−1) towards a second signal value (+1) upon the input signal exceeding the first threshold value, and vice versa, second comparator means for comparing the input signal with a second threshold value ($-V_d$) of negative polarity and for supplying a second comparator output signal in response thereto, said second comparator output signal changing over from a third signal value (−1) towards a fourth signal value (+1) upon the input signal exceeding the second threshold value, and vice versa, processing means for carrying out a function for determining whether a curve in an X-Y plane, said curve in said plane being obtained by plotting time equivalent signal values of the first and the second comparator output signals along the Y- and X-axis respectively of said X-Y plane, has at least one point in common with a predetermined line in said X-Y plane, said predetermined line lying in a half plane in said X-Y plane formed by a first line interconnecting a first fixed point and a second fixed point and in which half plane a third fixed point is located, said first fixed point being obtained by plotting said first signal value along said Y-axis and said third signal value along said X-axis, said second fixed point being obtained by plotting said second signal value along said Y-axis and said fourth signal value along said X-axis, said third fixed point in said X-Y plane being obtained by plotting said first signal value along said Y-axis and said fourth signal value along said X-axis, said predetermined line lying in said half plane between said first line and said third point, the processing means further being adapted to generate the unreliable decision signal upon detecting that said curve has at least one point in common with said predetermined line.

4. Apparatus as claimed in claim 3, wherein said processing means comprises first input terminals for receiving said first comparator output signal and second input terminals for receiving said second comparator output signal, a first transistor pair having interconnected first main electrodes and having their control electrodes coupled to said first input terminals, a second transistor pair having interconnected first main electrodes and having their control electrodes coupled to said second input terminals, the second main electrode of one transistor of the first and second transistor pairs being interconnected, and the second main electrode of the other transistor of the first and second transistor pairs being interconnected.

5. Apparatus as claimed in claim 4, wherein the processing means further comprise a current generator which is coupled to one of the interconnected second main electrodes.

6. Unreliability detector apparatus for generating an unreliable decision signal in response to an input signal, the apparatus comprising:

input means for receiving the input signal, first comparator means for comparing the input signal with a first threshold value ($+V_d$) of positive polarity and for supplying a first comparator output signal in response thereto, said first comparator output signal changing over from a first signal value (−1) towards a second signal value (+1) upon the input signal exceeding the first threshold value, and vice versa, second comparator means for comparing the input signal with a second threshold value (−$V_d$) of negative polarity and for supplying a second comparator output signal in response thereto, said second comparator output signal changing over from a third signal value (−1) towards a fourth signal value (+1) upon the input signal exceeding the second threshold value, and vice versa, processing means, comprising (a) first input terminals for receiving said first comparator output signal and second input terminals for receiving said second comparator output signal, (b) a first transistor pair having interconnected first main electrodes and having their control electrodes coupled to said first input terminals, (c) a second transistor pair having interconnected first main electrodes and having their control electrodes coupled to said second input terminals, the second main electrode of one transistor of the first and second transistor pairs being interconnected, the second main electrode of the other transistor of the first and second transistor pairs being interconnected, and (d) an output for supplying the unreliable decision signal.

* * * * *

Disclaimer

5,974,099 — Johannes O. Voorman, Eindhoven (NL); Johnannes W. M. Bergmans, Eindhoven (NL). UNRELIABILITY DETECTOR APPARATUS AND REPRODUCTION APPARATUS PROVIDED WITH THE UNRELIABILITY DETECTOR APPARATUS. Patent dated October 26, 1999. Disclaimer filed March 28, 2008, by the assignee, U.S. Philips Corporation.

Hereby enters this disclaimer to all claims of said patent.

*(Official Gazette, April 7, 2009)*